United States Patent
Aboul-Magd et al.

(10) Patent No.: US 11,632,799 B2
(45) Date of Patent: Apr. 18, 2023

(54) NON-PRIMARY CHANNEL TRANSMISSIONS IN WIRELESS NETWORK

(71) Applicants: Osama Aboul-Magd, Ottawa (CA); Yan Xin, Ottawa (CA); Jung Hoon Suh, Ottawa (CA)

(72) Inventors: Osama Aboul-Magd, Ottawa (CA); Yan Xin, Ottawa (CA); Jung Hoon Suh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 17/122,964

(22) Filed: Dec. 15, 2020

(65) Prior Publication Data

US 2022/0191929 A1    Jun. 16, 2022

(51) Int. Cl.
*H04L 5/00*     (2006.01)
*H04W 74/08*   (2009.01)
*H04W 80/02*   (2009.01)
*H04W 84/12*   (2009.01)

(52) U.S. Cl.
CPC ....... *H04W 74/0816* (2013.01); *H04L 5/0055* (2013.01); *H04W 80/02* (2013.01); *H04W 84/12* (2013.01)

(58) Field of Classification Search
CPC . H04W 74/0816; H04W 80/02; H04W 84/12; H04L 5/0055
See application file for complete search history.

(56) References Cited

U.S. PATENT DOCUMENTS

| | | | | |
|---|---|---|---|---|
| 2013/0121337 | A1* | 5/2013 | Nguyen | H04L 45/70 370/410 |
| 2015/0009907 | A1 | 1/2015 | Merlin et al. | |
| 2015/0188675 | A1* | 7/2015 | Abeysekera | H04J 11/0063 370/329 |
| 2016/0316455 | A1* | 10/2016 | Asterjadhi | H04W 72/121 |

(Continued)

FOREIGN PATENT DOCUMENTS

| | | |
|---|---|---|
| CN | 104796989 A | 7/2015 |
| CN | 104883711 A | 9/2015 |
| CN | 106455114 A | 2/2017 |

OTHER PUBLICATIONS

Verma et al., "Proposals On Unused Bandwidth Utilizations", Aug. 26, 2020.

*Primary Examiner* — Ivan O Latorre
*Assistant Examiner* — Malick A Sohrab

(57) ABSTRACT

Method and system for transmitting data by a transmit device in a wireless communication channel bandwidth of a wireless network, the wireless communication channel bandwidth including a set of adjacent frequency channels of uniform bandwidth that comprise a primary channel for the transmit device and a plurality of secondary channels, including: sending, when the primary channel is sensed by the transmit device to be busy, a request frame for a receive device on one or more of the secondary channels that are sensed by the transmit device to be idle; monitoring, by the transmit device, for a response frame on each of the one or more of the secondary channels; and sending, by the transmit device, a data transmission for the receive device using a data channel that comprises one or more of the secondary channels on which the transmit device received a response frame from the receive device.

8 Claims, 13 Drawing Sheets

(56) References Cited

U.S. PATENT DOCUMENTS

| | | | |
|---|---|---|---|
| 2019/0174410 A1* | 6/2019 | Seok | H04W 52/0219 |
| 2019/0215884 A1* | 7/2019 | Patil | H04W 52/0219 |
| 2021/0168864 A1* | 6/2021 | Seok | H04W 74/0816 |
| 2021/0345403 A1* | 11/2021 | Kneckt | H04W 74/008 |

* cited by examiner

NON-PRIMARY CHANNEL TRANSMISSIONS IN WIRELESS NETWORK

TECHNICAL FIELD

The present application relates to air interface technologies, in particular to methods and systems for transmitting information in non-primary wireless local area network channels.

BACKGROUND

The Institute of Electrical and Electronics Engineers (IEEE) 802.11 standards are a group of media access control (MAC) and physical layer (PHY) specification standards for implementing Wi-Fi™ wireless local area network (WLAN) communication. The 802.11 standards have experienced steady development and continue to be developed to meet the ever increasing demand for enhanced throughput, reduced latency and jitter, higher reliability, and improved power efficiency driven by new and emerging applications including virtual or augmented reality, immersive gaming, remote office support and cloud computing.

The IEEE 802.11n (High Throughput (HT)) amendment to the 802.11 standards introduced the concept of primary and secondary channels of 20 MHz each to support a 40 MHz bandwidth. IEEE 802.11ac (Very High Throughput (VHT)) extended the concept of primary and secondary channels channel to support wider channels. Primary and Secondary channels are also included in IEEE 802.11ax (High Efficiency (HE)), and are expected to be used in future WLAN standards.

In existing solutions, one option for a transmitting device to determine channel availability is through channel sensing. For example, a channel sensing protocol can include preamble detection for a defined duration (e.g., for a distributed inter-frame space (DIFS)), followed by a backoff duration, on a primary channel, along with sensing secondary channels for a defined duration (e.g., priority inter-frame space (PIFS)) before expiry of the backoff duration. The primary channel must be available for any transmission to start.

Existing solutions can also rely on bandwidth signaling in which a transmitting device sends a request-to-send (RTS) control frame on a primary channel and a target device responds with clear-to-send (CTS) control frames only on the primary channel (if available) and any contiguous secondary channels that are available. Again, the primary channel must be available for any transmission to start.

Existing solutions lack flexibility as the primary channel must be available for transmission to occur. Accordingly, there is a need for greater flexibility in allocating transmissions channels for wide bandwidth transmissions in a multichannel WLAN environment.

SUMMARY

The present disclosure describes systems and methods whereby non-primary channels can be used for a data transmission in a wireless network even if a primary channel is not available. This can, in at least some scenarios, enable more efficient use of network resources and allow overall system throughput to be increased.

According to a first example aspect is a method for transmitting data by a transmit device in a wireless communication channel bandwidth of a wireless network. The wireless communication channel bandwidth includes a set of adjacent frequency channels of uniform bandwidth that comprise a primary channel for the transmit device and a plurality of secondary channels. The method includes: sending, when the primary channel is sensed by the transmit device to be busy, a request frame for a receive device on one or more of the secondary channels that are sensed by the transmit device to be idle; monitoring, by the transmit device, for a response frame on each of the one or more of the secondary channels; and sending, by the transmit device, a data transmission for the receive device using a data channel that comprises one or more of the secondary channels on which the transmit device received a response.

In some examples of the preceding aspect, each of the primary channel and the secondary channels has a bandwidth of 20 MHz, and the request frame and the response frame each have respective frame formats configured for a 20 MHz channel.

In some examples of the preceding aspects, the request frame and the response frame are a request-to-send (RTS) and clear-to-send (CTS) frame respectively, each comprising a Physical (PHY) Header and a Medium Access Control (MAC) Header, In some examples of the preceding aspects, the PHY Header of one or both of the RTS frame and the CTS frame includes a temporary primary channel subfield for indicating if the secondary channel that the CTS frame is sent on is a temporary primary channel.

In some examples of the preceding aspects, the method includes: selecting, when the transmit device receives CTS frames from receive device on a plurality of the secondary channels, one of the primary channels as a temporary primary channel based on the temporary primary channel subfield of the CTS frames; and performing, after receiving the CTS Frames and prior to sending the data transmission, sensing of the selected temporary primary channel to confirm that the selected temporary primary channel is idle.

In some examples of the preceding aspects, the temporary primary channel subfield consists of a single bit in a service field of the PHY Header.

In some examples of the preceding aspects, the method includes, after receiving response frames on a plurality of the secondary channels, a set of the secondary channels to use for the data channel, and prior to sending the data transmission, sensing the secondary channels included in the data channel to confirm that the data channel is idle.

In some examples of the preceding aspects, the request frame and the response frame are a transmit-on-secondary-request (ToSR) frame and a transmit-on-secondary granted (ToSG) frame respectively, each comprising a Physical (PHY) Header and a Medium Access Control (MAC) Header and a temporary primary bitmap field, the temporary primary bitmap field including respective bit locations mapping to respective secondary channels for indicating one of the secondary channels as a temporary primary secondary channel.

In some examples of the preceding aspects, the method includes determining, by the transmit device, to apply either a first acknowledgement mode or a second acknowledgement mode, wherein in the first acknowledgement mode the transmit device will, after sending the data transmission, monitor for a duplicate acknowledgment frame on all of the secondary channels included in the data channel, and in the second acknowledgement mode the transmit device will, after sending the data transmission, monitor for an acknowledgment frame only on a secondary channel that is known by the transmit device as the temporary primary channel.

In some examples of the preceding aspects, wherein the ToSR frame and the ToSG frame each include an acknowledgement mode field for selectively indicating the first acknowledgement mode or the second acknowledgement mode.

According to a second example aspect is a method for receiving data sent by transmit device in a wireless communication channel bandwidth of a wireless network, the wireless communication channel bandwidth including a set of adjacent frequency channels of uniform bandwidth that comprise a primary channel for the transmit device and a plurality of secondary channels, the method comprising: receiving, at a receive device, a request frame on one or more of the secondary channels; sending, by the receive device, a response frame on at least some of the one or more of the secondary channels; and receiving, by the receive device, a data transmission through a data channel that includes the secondary channels on which the receive device sent response frames, the data channel excluding the primary channel.

In some examples of the second aspect, the method includes determining, by the receive device, based on information included in one or more request frames, to apply either a first acknowledgement mode or a second acknowledgement mode, wherein in the first acknowledgement mode the receive device will, after receiving the data transmission, send duplicate acknowledgment frames on all of the secondary channels included in the data channel, and in the second acknowledgement mode the receive device will, after receiving the data transmission, send an acknowledgment frame only on a single secondary channel.

According to a third example aspect, a wireless station is disclosed that is configured to perform the method of any of the preceding aspects.

According to a further example aspect, a non-volatile computer readable medium is disclosed that stores instructions for configuring a wireless station to perform the method of any of the preceding aspects.

According to a further example aspect is an access point station (AP) for transmitting data for a station (STA) in a communication channel bandwidth of wireless local area network (WLAN), the wireless communication channel bandwidth including a set of adjacent frequency channels of uniform bandwidth that comprise a primary channel assigned to the AP and a plurality of secondary channels. The AP includes a processing unit; a transmitter and receiver coupled to the processing unit for sending and receiving signals in the WLAN; and a non-transient storage storing executable instructions that, when executed by the processing unit, cause the AP to: send, when the primary channel is sensed by the AP to be busy, a request frame for a STA on one or more of the secondary channels that are sensed by the AP to be idle; monitor for a response frame on each of the one or more of the secondary channels; and send a data transmission for the STA using a data channel that comprises one or more of the secondary channels on which the AP received a response frame from the STA.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

The present disclosure teaches methods, devices, and systems for transmitting data in a wireless network, including for example a wireless local area networks (WLAN) such as a Wi-Fi™ network. Example embodiments are disclosed that are directed to enabling optimized performance in a multi-channel transmission environment between a transmitting device and a receiving device.

Figure 1:
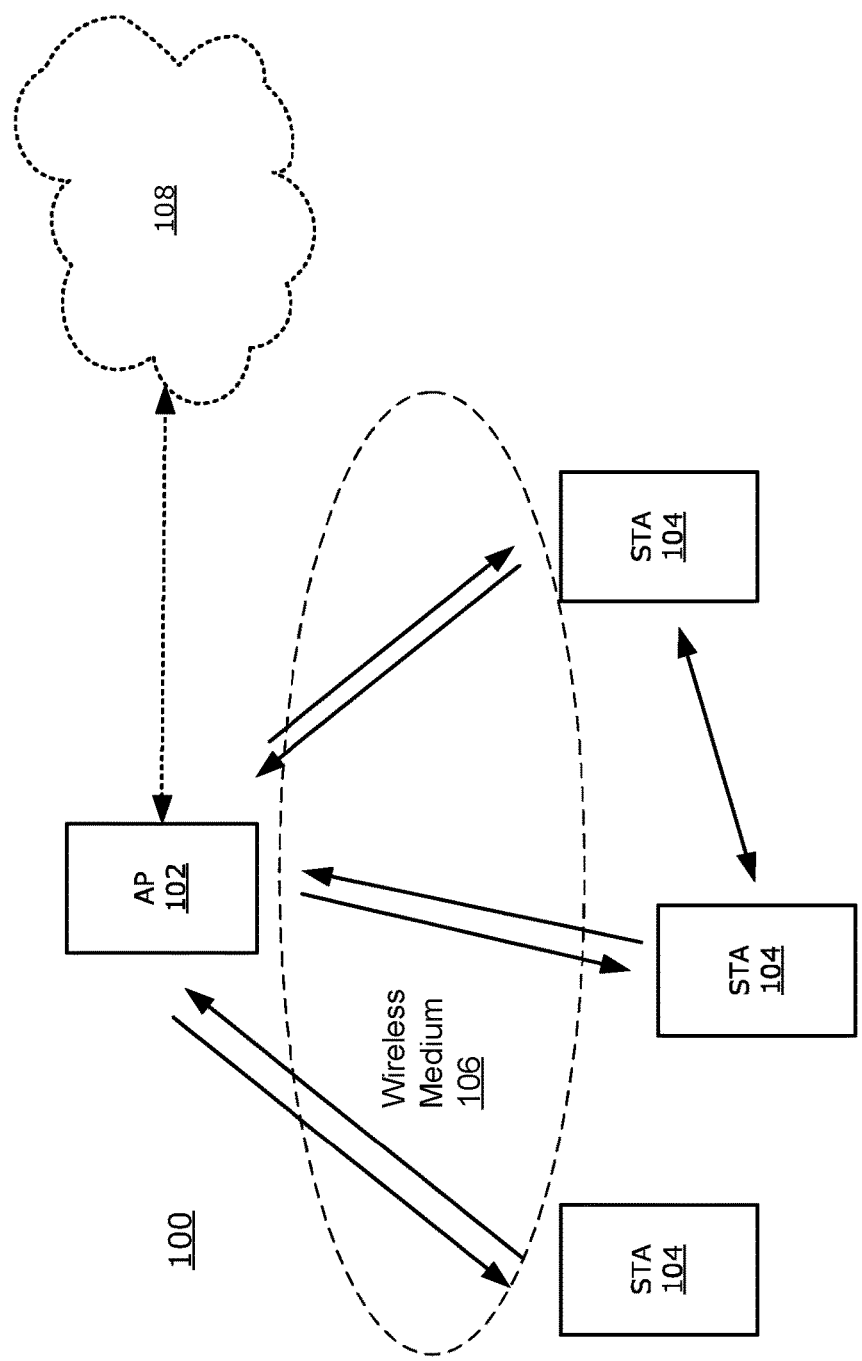
FIG. 1 is a block diagram illustrating an example communication network in accordance with one implementation of the present disclosure.

An example of a communication network 100 in which the devices and methods described below can operate will be described with reference to FIGS. 1 and 2. As illustrated in FIG. 1, network 100 comprises a plurality of communications devices that can include fixed, portable, and moving devices (referred to as stations). The example of FIG. 1 illustrates a single fixed access point station (AP) 102, and a plurality of non-AP stations (STAs) 104 that may be stationary, portable or mobile. In at least some examples, network 100 is a Wi-Fi compliant network that operates in accordance with one or more protocols from the 802.11 standards, including amendments that are being developed or will be developed in the future. WLAN 106 may be configured to support OFDM transmission techniques.

Each STA 104 may be a laptop, a desktop PC, PDA, Wi-Fi phone, wireless transmit/receive unit (WTRU), mobile station (MS), mobile terminal, smartphone, mobile telephone, sensor, internet of things (IOT) device, or other wireless enabled computing or mobile device. In some embodiments, a STA 104 comprises a machine which has the capability to send, receive, or send and receive data in the WLAN 106 but which performs primary functions other than communications. In some embodiments, a machine includes an apparatus or device with means to transmit and/or receive data through network 100 but such apparatus or device is not typically operated by a user for the primary purpose of communications.

The AP 102 may comprise a bi-directional network access interface which functions as a wireless transmission and/or reception point for STAs 104 in the network 100. The AP 102 may be connected to a backhaul network 108 which enables data to be exchanged between the AP 102 and other remote networks (including for example the Internet), nodes, APs, and devices (not shown). The AP 102 may support communications through an unlicensed radio frequency wireless medium 106 with each STA 104 by establishing uplink and downlink communications channels with each STA 104, as represented by the arrows in FIG. 1. In some examples, STAs 104 may be configured to communicate with each other. Communications in the network 100 may be unscheduled, scheduled by the AP 102 or by a further scheduling or management entity in the network 100, or a mix of scheduled and unscheduled communications.

Figure 2:
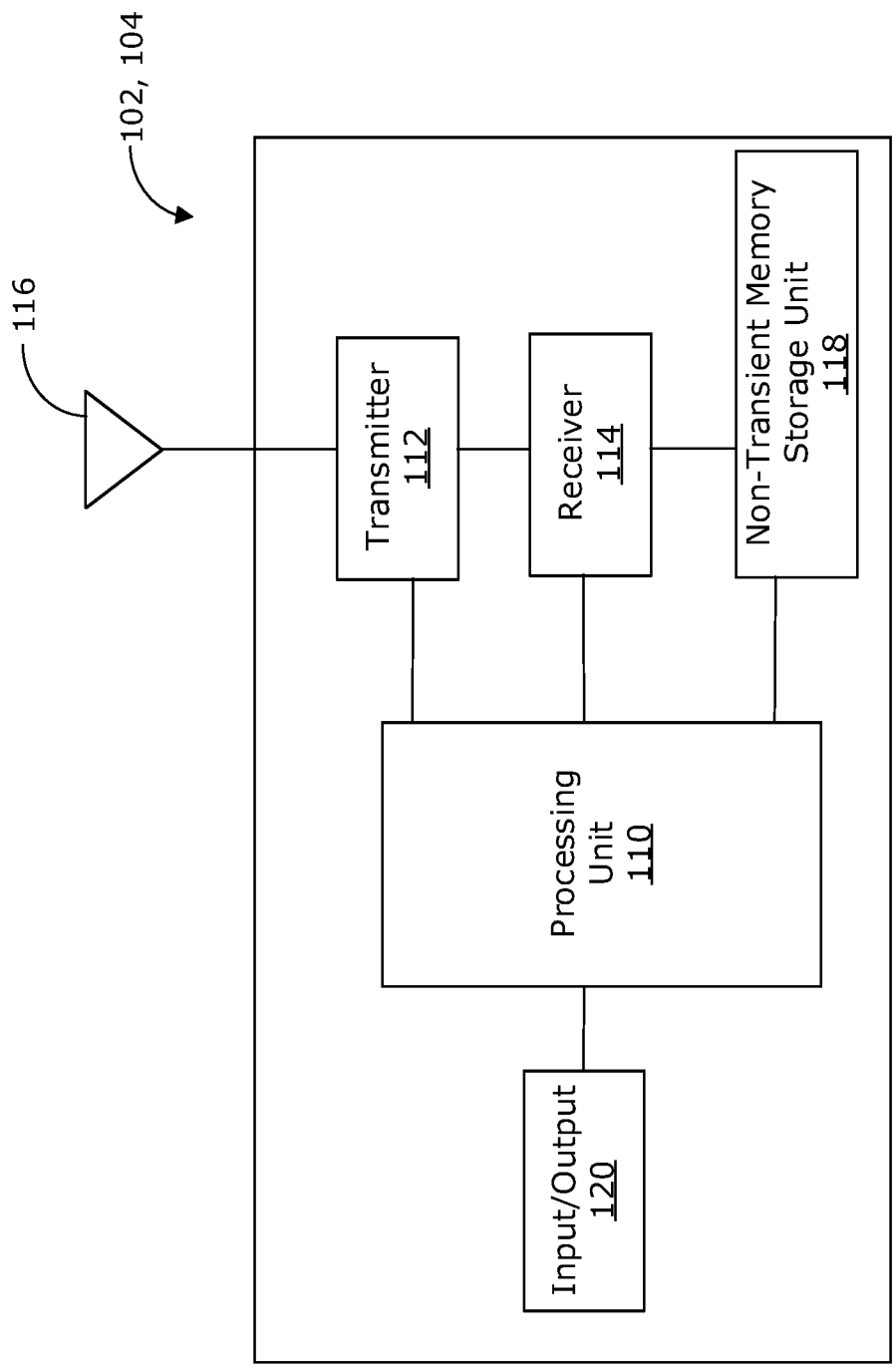
FIG. 2 is a block diagram illustrating an example processing system that can be used to implement a station in the communication network of FIG. 1 in accordance with one implementation of the present disclosure.

FIG. 2 shows an example wireless communication apparatus or device that may act as an AP 102 or a STA 104 shown in FIG. 1. The wireless communication device includes at least one processing unit 110, at least one transmitter 112, at least one receiver 114, one or more antennas 116, storage including at least one non-transitory memory storage unit 118, and one or more input/output (I/O) devices or interfaces 120.

The processing unit 110 implements various processing operations of AP 102 or the receiving STA 104, such as signal coding, data processing, power control, input/output processing, or any other functionality. The processing unit 110 can also be configured to implement some or all of the functionality and/or embodiments described herein. Each processing unit 110 includes any suitable processing or computing device configured to perform one or more operations. Each processing unit 110 can, for example, include a microprocessor, microcontroller, digital signal processor, field programmable gate array, or application specific integrated circuit. The processing unit 110 may be configured to generate wireless signals based on input data received through an input (via I/O interfaces 120) for transmission by the transmitter 112, or to process wireless signals received from receiver 114. In example embodiments, the processing unit 110 may be configured to generate OFDM or orthogonal frequency division multiple access (OFDMA) signals that are suitable for transmission by, for example, performing an inverse fast Fourier transform (IFFT) or inverse discrete Fourier transform (IDFT) or any other suitable processing technique. The processing unit 110 may also be configured to process received OFDM signals or OFDMA signals by, for example, performing a Fast Fourier Transform (FFT) or discrete Fourier transform (DFT) or any other suitable processing technique. In some embodiments, the processing unit 110 may be configured to detect the presence of an OFDM signal or OFDMA signal by performing a correlation or cross-correlation, to detect a preamble. The preambles may be part of a predetermined frame structure for Wi-Fi communication. Although a single instance of a processing unit 110 is shown, it is to be understood that multiple instances of the processing unit 110 may be present in each wireless communication apparatus. For example, there may be at least one processing unit for processing output signals to be transmitted by the transmitter 112 and at least one processing unit for processing input signals from the receiver 114.

Transmitter 112 may include any suitable structure for generating signals for wireless or wired transmission. Each receiver 114 may include any suitable structure for processing signals received wirelessly or by wire. Each transmitter 112 and receiver 114 can include associated amplification and modulation/demodulation circuitry. Although shown as separate components, at least one transmitter 112 and at least one receiver 114 may be combined into a single transceiver. Each antenna 116 may include any suitable structure for transmitting and/or receiving wireless or wired signals. Although a common antenna 116 is shown here as being coupled to both the transmitter 112 and the receiver 114, one or more antennas 116 could be coupled to one or more transmitter(s) 112, and one or more separate antennas 116 could be coupled to one or more receiver(s) 114. In some examples, one or more antennas 116 may be an antenna array, which may be used for beamforming and beam steering operations. Device storage can include any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. The non-transitory memory storage unit 118 may store instructions and data used, generated, or collected by AP 102 or STA 104. For example, the non-transitory memory storage unit 118 could store software instructions or modules configured to implement some or all of the functionality and/or embodiments described herein and that are executed by the processing unit(s) 110.

The I/O interfaces 120 may permit interaction with a user or other devices in the network. The I/O interfaces 120 includes any suitable structure(s) for providing information to or receiving/providing information from a user, including network interface communications.

In some embodiments, the AP 102 and STA 104 may be configured to communicate over various wireless spectra, for example, bandwidths of 20 MHz, 40 MHz, or 80 MHz, 80+80 MHz, 160 MHz, 160+160 MHz, 320 MHz, 320+320 MHz, 480 MHz (such as 160+160+160 MHz), and 640 MHz in the 2.4 GHz, 5 GHz and 6 GHz bands. According to some wireless standards, such as IEEE 802.11ax, an OFDMA channel is subdivided into multiple resource units (RUs), where each RU consists of a group of contiguous subcarriers defined in the frequency domain. In IEEE 802.11ax, RUs are defined based on RU sizes such as 26-tone RU, 52-tone RU, 106-tone RU, 242-tone RU, 484-tone RU, 996-tone RU and 2×996-tone RU. Although reference is made to IEEE 802.11ax, it is noted that techniques or mechanisms according to some implementations of the present disclosure can be used in conjunction with other standards, including future generations of IEEE 802.11 such as extra high throughput (EHT) standards or different standards.

In the wireless network 100, the wireless communication devices, such as AP 102 and STA 104, communicate with one another through various well-defined frame structures. The frame structures, such as a Physical Layer Convergence Procedure Protocol Data Unit (PPDU), may be generated by the processing unit 110 of the wireless communication apparatus shown in FIG. 2. In some embodiments, a frame structure may be configurable to have the same bandwidth as a channel. The frame structure may be in the form of a PPDU which may include a frame preamble portion, and a payload portion. In some embodiments, there may be different types of PPDUs that may have different fields and different PHY layers and/or different MAC layers. For example, a single user (SU) PPDU, multiple-user (MU) PPDU, LPI PPDU, long-range (LR) SU PPDU, trigger-based (TB) PPDU.

Figure 3:
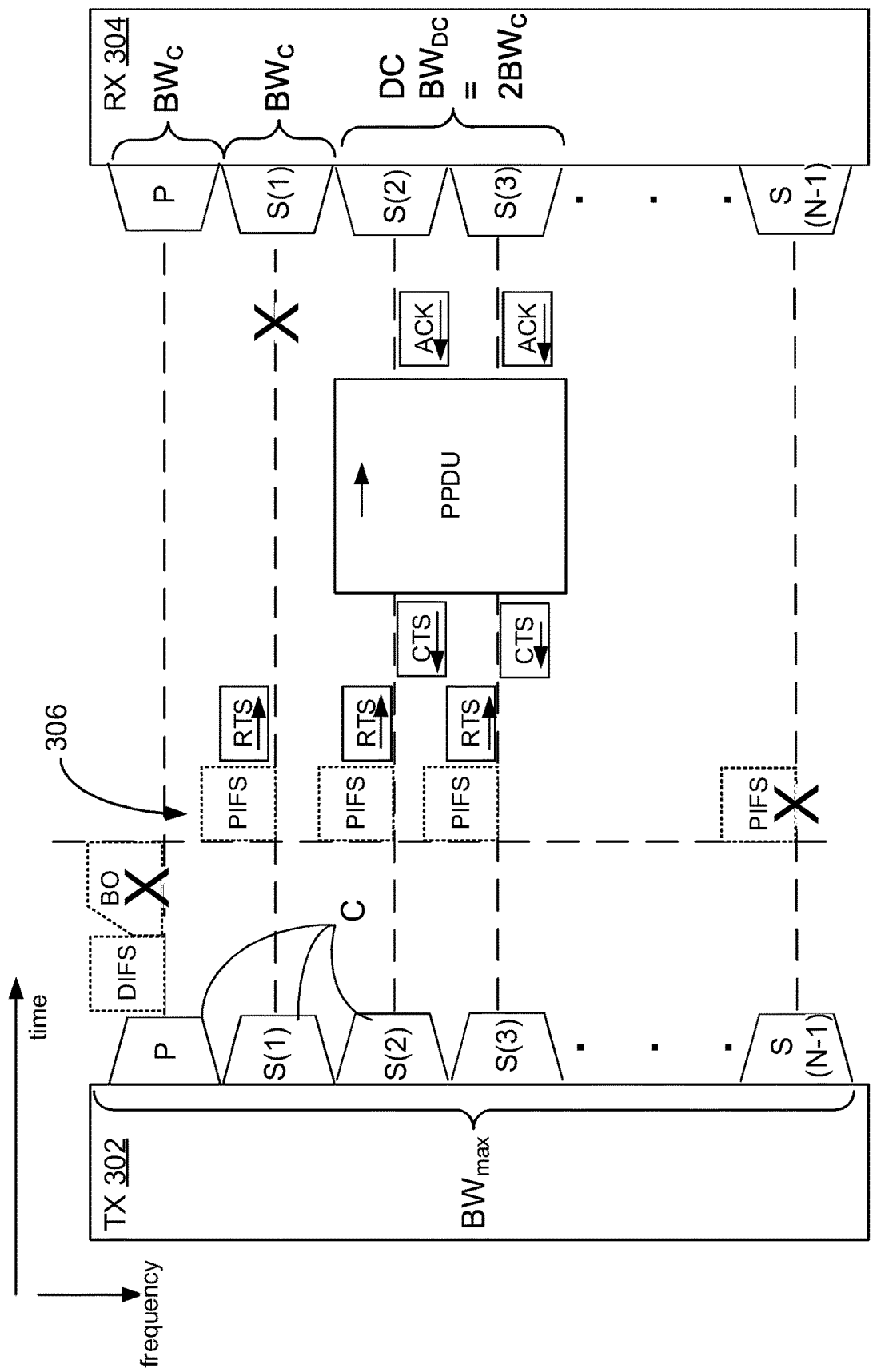
FIG. 3 shows a signalling diagram illustrating an example of non-primary channel data transmissions between a transmit device and a receive device according to an example the present disclosure.

In example embodiments, a data channel bandwidth ($BW_{DC}$) used for sending a PPDU is dynamically determined through a channel sensing and signalling protocol. FIG. 3 is a block diagram illustrating signalling over time and across frequency between a transmit device 302, which may for example be an AP 102, and a receive device 304, which may for example be a STA 104. In the illustrated example, a WLAN protocol is applied that selects a data channel (DC) having a bandwidth $BW_{DC}$ by combining base channels C within a set of contiguous channels that collectively have a maximum communication channel bandwidth ($BW_{max}$). The maximum communication channel bandwidth $BW_{max}$ includes N contiguous channels C (e.g., a primary channel P and N−1 secondary channels S(1) to S(N−1)) of equal bandwidth ($BW_c$). Secondary channels can also be referred to as non-primary channels. In an example embodiment, the maximum communication channel bandwidth $BW_{max}$ is 160 MHz, each of the primary channel P and S(1) to S(N−1) secondary channels has a bandwidth $BW_c$ of 20 MHz and N=8, and supported data channel DC bandwidths $BW_{DC}$ include 20, 40, 80 or 160 MHz. However these values are representative and in different scenarios different values of $BW_{max}$, $BW_c$, and N may be used. For example, some scenarios may additionally or alternatively support a maximum communication channel bandwidth $BW_{max}$ of 640 MHZ, with primary channel P and S(1) to S(N−1) secondary channels each having a bandwidth $BW_c$ of 160 MHz and N=4, and supported data channel DC bandwidths $BW_{DC}$ include 160, 320, 480 or 640 MHz. In some examples the values of $BW_{max}$, $BW_c$, and N may be configured by a system administrator or a communication device according to predetermined criteria and/or based on the abilities of the transmit and receive devices involved in a communication.

Figure 4:
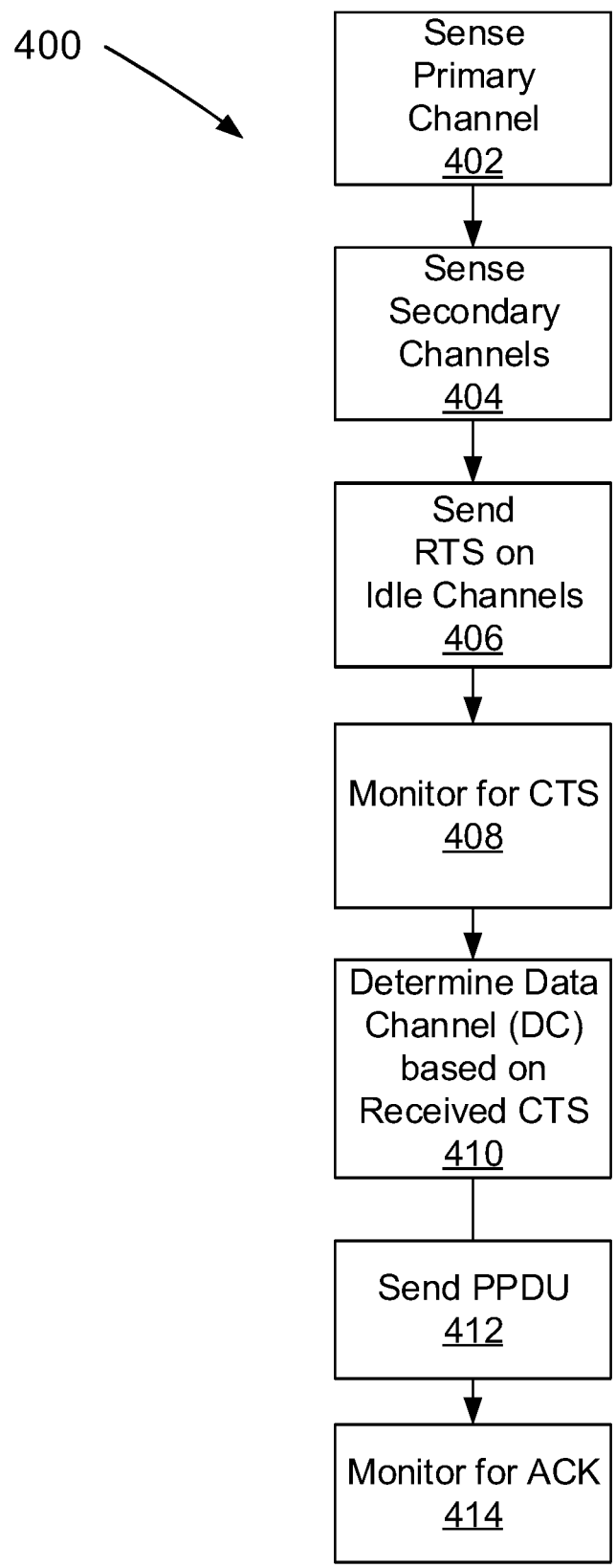
FIG. 4 is a flow chart of a data transmission method that corresponds to the signalling diagram of FIG. 3.

In example embodiments, transmit device 302 is configured to determine which of the N contiguous channels C are available for transmitting a multichannel data frame (e.g., a PPDU) and then use the available channels for the PPDU transmission. FIG. 4 is a flow diagram illustrating an example of a transmission method 300 that can be applied by transmit device 302 of FIG. 3. Transmission method 300 commences when transmit device 302 has data to transmit using a data frame (e.g., PPDU) for target receive device 304. Prior to the start of transmission method 300, the values of $BW_{max}$, $BW_c$, and N are defined parameters known to the transmit device 302. The particular channel C that is designated as the primary channel P for the transmit device 302 is also known. In some examples (for example when transmit device 302 is an AP 102), the designated primary channel P for the AP 102 is assigned when the AP 102 is configured and the STAs 104 are each made aware of the primary channel P assignment when they register with the AP 102. In some examples, the designated primary channel P for the AP 102 can be periodically changed, for example by a system administrator. As indicated at action 402, the transmit device 302 performs sensing of the primary channel P to determine if the primary channel P is available or not.

With reference to FIG. 3, as part of primary sensing action 402, the transmit device 302 monitors the primary channel P. Upon sensing that a previously busy channel P has become free, the transmit device 302 waits for defined duration (e.g., a DIFS) and continues sensing the primary channel for a backoff (BO) duration to determine if the channel remains free during the BO duration. The length of the BO duration is determined by the transmit device 302 at the start of the BO duration by randomly sampling an integer number (e.g., b) from a uniformly distributed contention window [0,CW], where CW is a predefined value that is set for the transmit device 302. During the BO duration, the transmit station 302 counts down and monitors the primary channel B to determine if the channel O remains free (e.g., idle) for b SLOT intervals before attempting to transmit.

In prior known primary channel contention solutions, if a transmission by a further device is sensed on the primary channel C before the end of the BO duration, the count down freezes and the transmit device waits again for the primary channel to become free. The transmission process is delayed until the primary channel is again sensed to be free, at which time the BO duration either continues or is restarted. This can lead to inefficient use of channel time and frequency resources as such a solution assumes that if the primary channel P is busy then all secondary channels S(1) to S(N−1) are also unavailable, when in fact at least some of the secondary channels may be idle and thus available. According to example embodiments, transmit device 302 does not operate in the same manner as prior known channel contention solutions. In particular, if transmit device 302 senses a busy primary channel C during the BO duration, the transmit device 302 does not delay or stop the ongoing transmission process to wait for the primary channel P to become free. Instead, the transmit device 302 continues on with transmission method 300 to determine if any secondary channels S1 to S(1−N) are available, regardless of the sensed state of the primary channel P during the BO duration.

In particular, as indicated at action 402, the transmit device 302 performs sensing of the secondary channels S1 to S(1−N) to determine which of the secondary channels are currently idle. Referring to FIG. 3, the sensing can be performed in parallel for secondary channels S(1) to S(n−1) for a defined secondary channel sensing duration 306. In the example of FIG. 3, the defined sensing duration 306 corresponds to a PIFS (and a PIFS duration is less than a DIFS duration). In the embodiment of FIG. 3, the secondary channel sensing duration 306 immediately follows the BO duration. In alternative example embodiments, the secondary channel sensing duration 306 may coincide with or partially overlap with the end of the BO duration.

As indicated at action 406 of FIG. 4, at the end of the secondary channel sensing duration 306, the transmit device 302 then sends a request frame, for example a request-to-send (RTS) frame, for target receive device 304 on each of the channels C that were sensed to be idle. In the illustrative example of FIG. 3, the transmit device 302 determines during the BO duration that the primary channel P is busy, and determines during the secondary channel sensing duration 306 secondary channels S(1), S(2) and S(3) are idle and that the other secondary channels S(4) to S(N−1) are busy. Accordingly, the transmit device 302 sends an RTS frame on only the idle secondary channels S(1), S(2) and S(3). In examples, the RTS frames sent on each of the secondary channels S(1), S(2) and S(3) are duplicates of each other.

Figure 5:
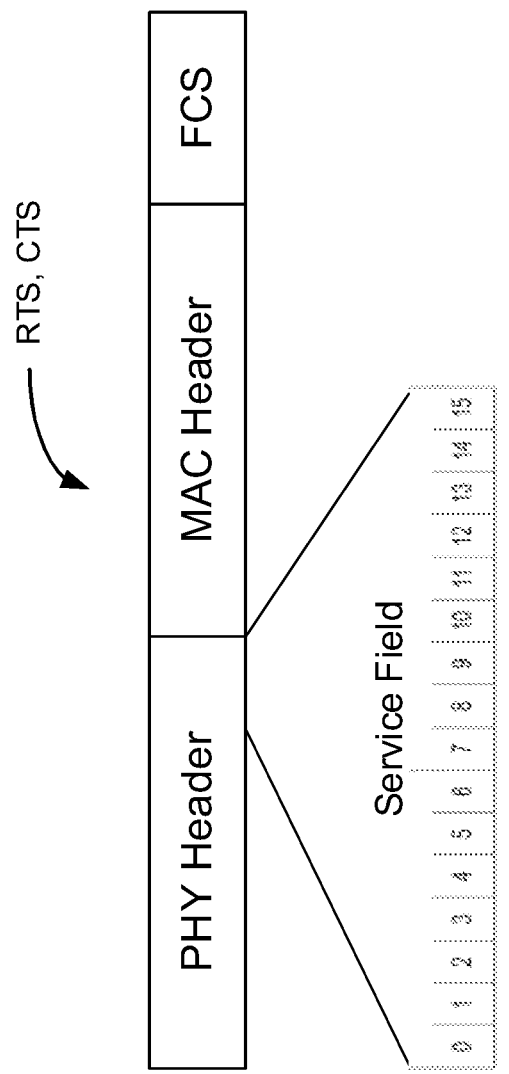
FIG. 5 shows a frame format according to example embodiments.

In the example of FIGS. 3 and 4, the RTS frame may use a format that is based on the RTS frame format used for prior solutions, for example an IEEE 802.11 non-high throughput (Non-HT) RTS frame format. In this disclosure, Non-HT frame can refer to a frame that has a format configured for 20 MHz channel, and may for example include RTS, CTS or ACK frames that are compatible with devices that conform to an IEEE 802.11 protocols for 20 MHZ channels. In this regard, FIG. 5 shows an example of an RTS Frame that includes a physical layer (PHY) Header, medium access control (MAC) Header, and frame check sequence (FCS). Included in the PHY header is a 16 bit service field. In some examples, PHY Header is an OFDM PHY header that consists of 4 rate bits, 1 reserved bit, 12 Length bits, 1 Parity bit, 6 Tail bits, and 16 Service bits. In known solutions (e.g., IEEE 802.11ac): bit location b4 of the Service bits is a dynamic/static bandwidth signalling bit used to indicate if the transmit device 302 is able to reduce the data channel bandwidth $BW_{DC}$ of the upcoming data frame (i.e., dynamic) or not (i.e., static); bit locations 5 and 6 are used to signal a target data channel bandwidth $BW_{DC}$ for the upcoming data frame (For example, in the case where $BW_{max}$, the following target data channel bandwidth $BW_{DC}$ could be indicated: b5,b6=(0,0)=20 MHz; b5,b6=(0,1)=40 MHz; b5,b6=(1,0)=80 MHz; b5,b6=(1,1)=160 MHz and 80+80 MHz); and bit location b7 is reserved. In some examples, the MAC Header is an OFDM MAC header that includes field specified compliant with one or more IEEE 802.11 standards, including for example: Frame Control (FC) field; Duration/ID Field (D/ID); Address Fields (including transmit device, receive device, source and destination address fields); Sequence Control Field and Frame Body Field.

As indicated at action 408, after sending the duplicate RTS frames, the transmit device 302 monitors for response frames, for example clear-to-send (CTS) frames, from the target receive device 304 on the same channels C that it sent the respective RTS frames on. Receive device 302 will only send CTS frames back to transmit device 302 on idle channels that it has received RTS frames on. The transmit device 302 will deem the channels C that it receives CTS frames on within a defined duration as available to use for transmitting a PPDU to target receive device 304, and will deem that the other channels are busy. In the illustrative example of FIG. 3, transmit device 302 monitors secondary channels S(1), S(2) and S(3) for CTS frames in response to the RTS frames that the transmit device 302 sent using secondary channels S(1), S(2) and S(3). In the illustrated example receive device 304 only successfully receives the RTS frames on secondary channels S(2) and S(3) (for example, the target receive device 302 may be within range of an interfering device that is using the bandwidth channel S(1) but is out of range of transmit device 302), and responds with CTS frames on secondary channels S(2) and S(3). Thus, in the illustrative example of FIG. 3, transmit device 302 receives CTS frames on contiguous secondary channels S(2) and S(3) and thus determines that secondary channels S(2) and S(3) are available for sending PPDU.

As indicated in action 410, the transmit device 302 then selects a set of channels C and corresponding bandwidth $BW_{DC}$ to use for the data channel DC for its planned data transmission. In example embodiments, if the number of available channels C can support the target channel bandwidth (which was indicated in the RTS), then the transmit device 302 will select a set of available channels C that collectively have the target channel bandwidth to use as the data channel DC (having bandwidth $BW_{DC}$) for the data transmission. In the event that there is an excess of available channels C, the set of channels selected by the transmit device 302 will be a contiguous subset of the available channels C.

In some examples, assuming that dynamic channel size is supported, if the number of available channels C do not have enough combined bandwidth to support the target channel bandwidth the transmit device 302 will select the next largest bandwidth that can accommodated by the available channels C as the data channel bandwidth $BW_{DC}$, and use the available channels C as the data channel DC.

In the example illustrated in FIG. 3, the transmit device 302 determines that the data channel DC will consist of adjacent secondary channels S(2) and S(3), such that the data channel DC has a bandwidth $BW_{DC}=2*BW_C$.

As indicated in action 412 of FIG. 4, the transmit device 302 then sends the data frame (e.g., PPDU) to the receive device 304 using the data channel DC (which consists of adjacent secondary channels S(2) and S(3) in the illustrated example.

As indicated in action 414, the transmit device 302 then monitors each of the channels C that form the data channel DC for respective acknowledgement frames (ACK). In example embodiments, the target receive device 304 will send a duplicate ACK frame on each channel C that was used for the data channel DC.

Accordingly, data transmission method 300 provides a mechanism by which non-primary channels can be used to for a data transmission channel even when a designated primary channel is unavailable. In at least some example scenarios, such a method can improve overall optimization of time frequency resources in a shared wireless medium. In some scenarios, this may allow faster sending and receiving of data and thus reduced power consumption at transmit and received devices.

A further example that enables non-primary channels to be used for data transmission channel when a designated primary channel is unavailable will now be described with reference to the signalling diagram of FIG. 6 and the flow chart of data transmission method 700 of FIG. 7. The transmission method 700 is similar to above described transmission method 400, with additional actions as described below.

Figure 6:
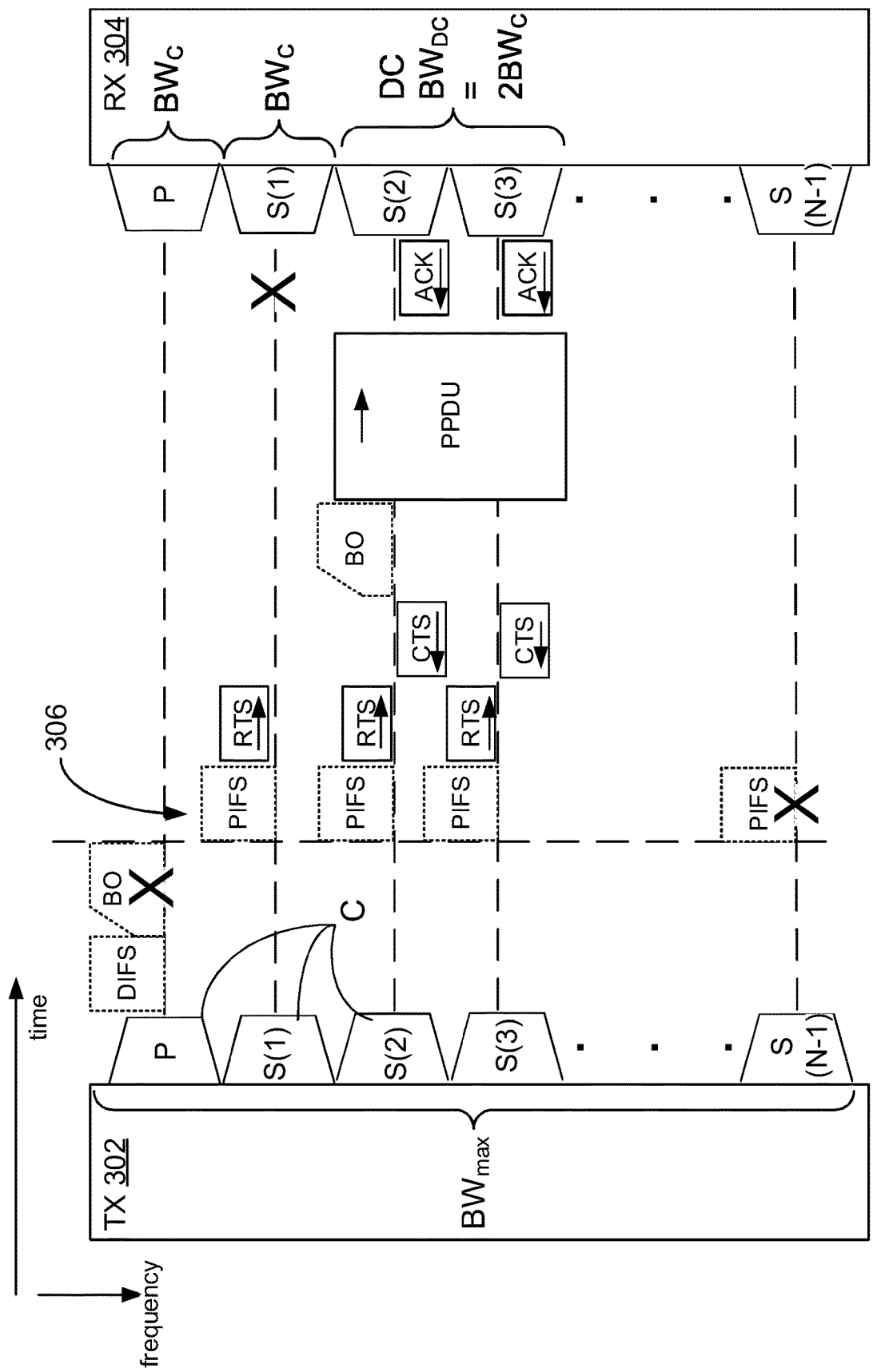
FIG. 6 shows a signalling diagram illustrating a further example of non-primary channel data transmissions between a transmit device and a receive device according to an example the present disclosure.
Figure 7:
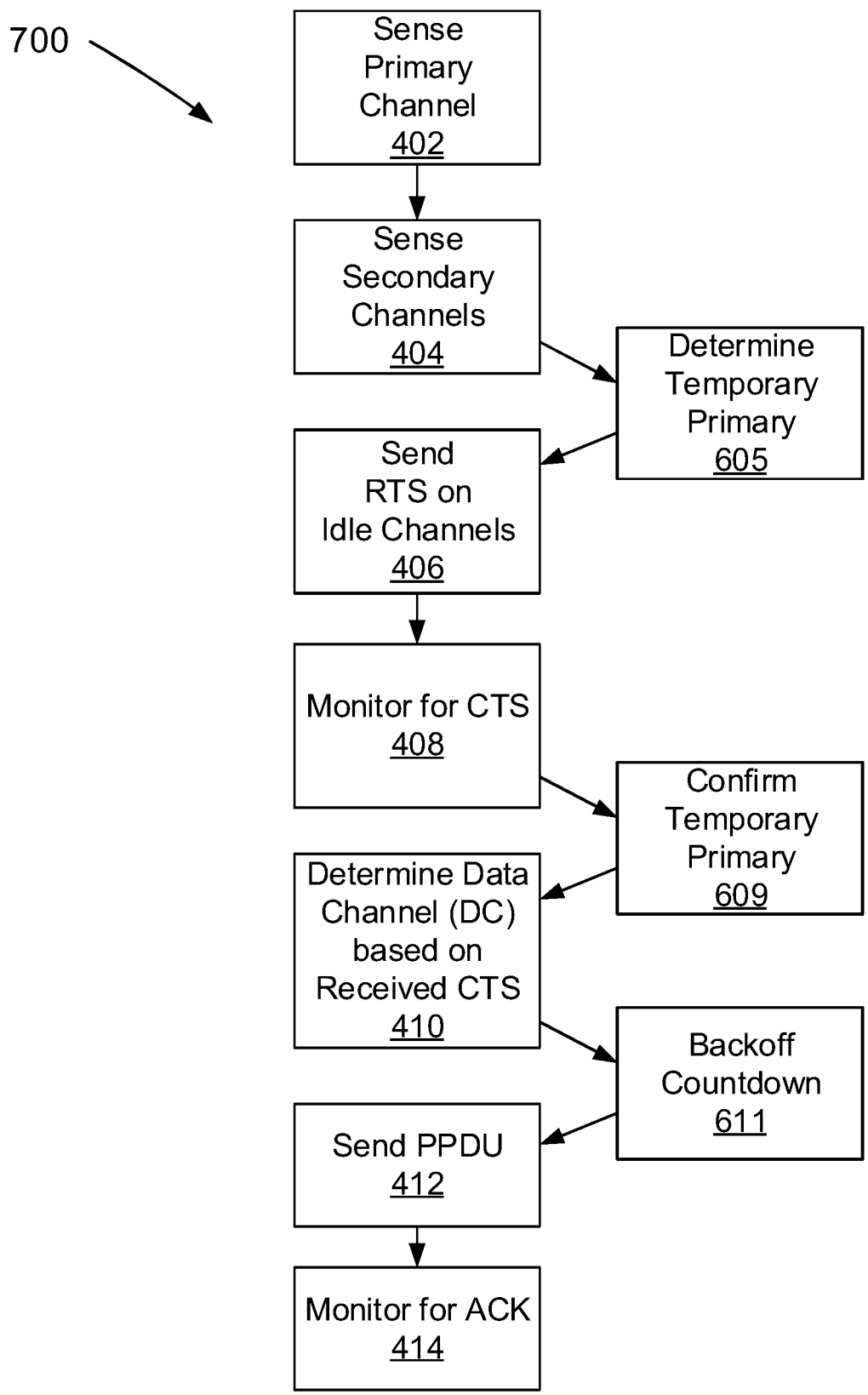
FIG. 7 is a flow chart of a data transmission method that corresponds to the signalling diagram of FIG. 6.

In the embodiment of FIG. 6, actions 402 (sense primary channel) and 404 (sense secondary channel) of data transmission method 700 are performed in the same way as described above in respect of data transmission method 400. In the illustrated embodiment, primary channel P is busy, and secondary channels S(1) to S(3) are sensed to be idle. Data transmission method 700 includes a further action 605 that is performed when the designated primary channel P is sensed to be busy. In action 605, the transmit device 302 selects one of the idle secondary channels (e.g., secondary channels S(1) to S(3) in the illustrated embodiment) as a candidate to use as temporary primary channel. The selection could be done on a random basis, or based on predetermined criteria (e.g., the secondary channel having the lowest channel number). The transmit device 302 signals its temporary primary channel selection to receive device 304 by setting a temporary primary channel indicator bit in the RTS frame send on the secondary channel that has been selected as the temporary primary channel selection. For example, a bit in the PHY header field of the RTS frame, such as bit B7 of the service subfield can be pre-assigned as a temporary primary channel selection bit. The transmit device 302 sets the temporary primary channel selection bit to one value (e.g., "1") to indicate that the secondary channel the RTS frame is being sent over is proposed as a temporary primary channel, and another value (e.g., "0") to indicate that the secondary channel the RTS frame is being sent over is not being proposed as a temporary primary channel.

By way of example, in the scenario of FIG. 6, the transmit device selects secondary channel S(1) as the temporary primary channel, and accordingly in action 406 the RTS frame sent on secondary channel S(1) has bit B7 of the service subfield of the PHY header set to "1". The RTS frames sent on secondary channels S(2) and S(3) are duplicate RTS frames, each having bit B7 of the service subfield of the PHY header set to "0".

The receive device 304 will respond with a CTS frame in each of the idle secondary channels that it successfully receives an RTS frame on. In example embodiments, the CTS frame has a frame structure similar to that of the RTS frame, and also includes a temporary primary channel selection bit. The receive device 304 can set the temporary primary channel selection bit in the CTS frames that it sends to either confirm the temporary primary channel selection made by the transmit device or to indicate an alternative temporary primary channel selection. For example, in the illustrated scenario of FIG. 6, the secondary channel S(1) that has been proposed by transmit device 302 is not a valid option from the perspective of received device 304 as receive device either senses secondary channel S(1) as busy or never successfully receives the RTS frame sent on secondary channel S(1). The receive device 304 must therefore select an alternative secondary channel from the channels on which it received the duplicate RTS fames (e.g., secondary channels S(2) and S(3) in the illustrated scenario). Receive device 304 may select one of the secondary channels using similar criteria that is applied by the transmit device 302, and then set the temporary primary channel selection bit in the respective CTS frames sent on the secondary channels to indicate the choice.

By way of example, in the scenario of FIG. 6, the receive device selects secondary channel S(2) as the temporary primary channel, and accordingly the CTS frame sent on secondary channel S(2) has bit B7 of the service subfield of the PHY header set to "1". The CTS frames sent on secondary channel S(3) has bit B7 of the service subfield of the PHY header set to "0".

As indicated at action 408, transmit device 302 monitors for CTS frames on the channels that used to send RTS frames. As indicated in action 609, transit device 302 confirms the temporary primary channel selection based on the temporary primary channel selection bits in the respective CTS frames that are received. In the illustrated scenario, transmit device 302 will confirm that its previous selection of secondary channel S(1) is not an option for the receive device 302 and instead proceed with using the alternative proposed by the receive device 304, namely secondary channel S(2), as the selected temporary primary channel.

In some examples, action 605 can be omitted and the temporary primary channel selection can be performed only at the receive device 304 based on transmit channels that the receive device knows are available to both the receive device 304 and the transmit device 302. In some examples, temporary primary channel selection at the receive device 304 can be omitted, with the transmit device 304 performing selection at action 609 based on transmit channels that the transmit device 302 knows are available to both the receive device 304 and the transmit device 302.

Data channel selection action 410 of transmission method 700 can be performed in the same manner as in transmission method 400 described above. However, prior to sending the PPDU, data transmission method 700 includes an additional backoff BO countdown action 611 that is performed in respect of the selected temporary primary channel (e.g., secondary channel S(2) in the illustrated example of FIG. 6). In particular, after receiving the CTS frames, the transmit device 302 then senses the temporary primary channel for a backoff (BO) duration to confirm that the temporary primary channel remains free during the BO duration. The length of the BO duration applied in action 611 is determined by the transmit device 302 at the start of the BO duration by randomly sampling an integer number (e.g., b SLOT intervals) from a uniformly distributed contention window [0, CW], where CW is a predefined value that is set for the transmit device 302. During the BO duration, the transmit station 302 counts down and monitors the temporary primary channel (e.g., secondary channel S(2) in the illustrated example) to determine if the channel remains free (e.g., idle) for b SLOT intervals before attempting to transmit. If the temporary primary channel remains idle for the BO duration, then the transmit station 302 will proceed with sending the PPDU using the selected data channel DC, as per action 412. In some examples, if the temporary primary channel is sensed busy during BO duration of action 611, the current transmission attempt is suspended and method 700 is started over. In some examples if the temporary primary channel is sensed busy during BO duration of Action 611, the current transmission attempt is suspended until the temporary primary channel is sensed idle for a duration (e.g., a DIFS) and then the BO sensing operation is repeated for up to a predetermined number of times.

As indicated at action 414, after transmit device 302 sends the PPDU, it monitors for acknowledgment from the receive device 304. In some examples (for example, when both the transmit device 302 and receive device 304 know which secondary channel is the temporary primary channel such as when the receive device 304 has indicated confirmation or selection of the temporary primary channel in a CTS frame), then the receive device 304 may send an ACK frame on only the temporary primary channel and the transmit device 302 will only expect an ACK frame on the temporary primary channel. In other examples, a duplicate ACK frame is sent by the receive device 304 on all the channels C (e.g., the temporary primary channel and any other secondary channels) used for the data transmission channel DC, and transmit device 302 will expect ACK frames on all such channels.

A further example that enables non-primary channels to be used for data transmission channel when a designated primary channel is unavailable will now be described with reference to the signalling diagram of FIG. 8 and the flow chart of data transmission method 900 of FIG. 9. The transmission method 900 is similar to above described transmission method 700, with differences as described below.

Figure 8:
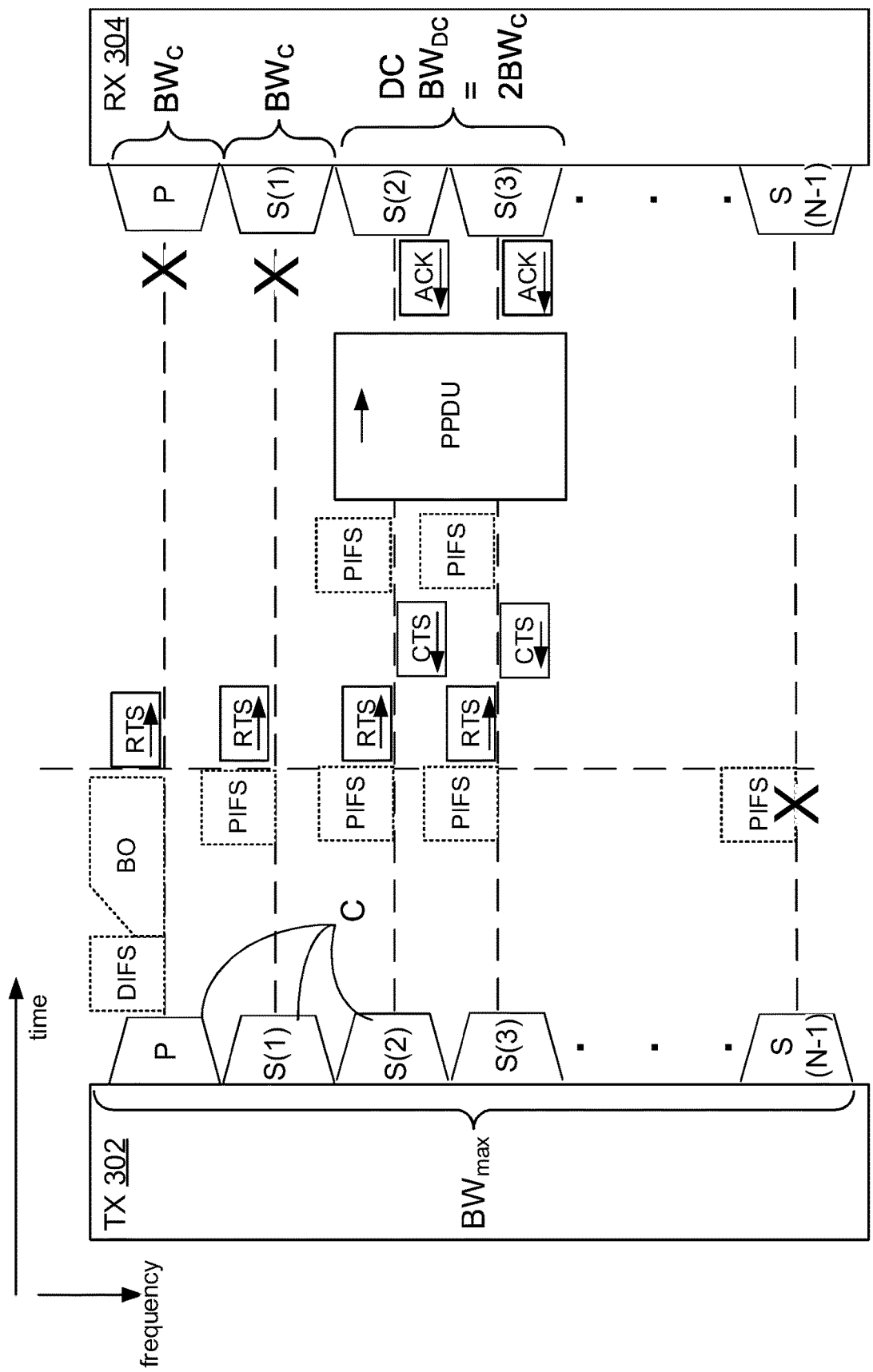
FIG. 8 shows a signalling diagram illustrating a further example of non-primary channel data transmissions between a transmit device and a receive device according to an example the present disclosure.
Figure 9:
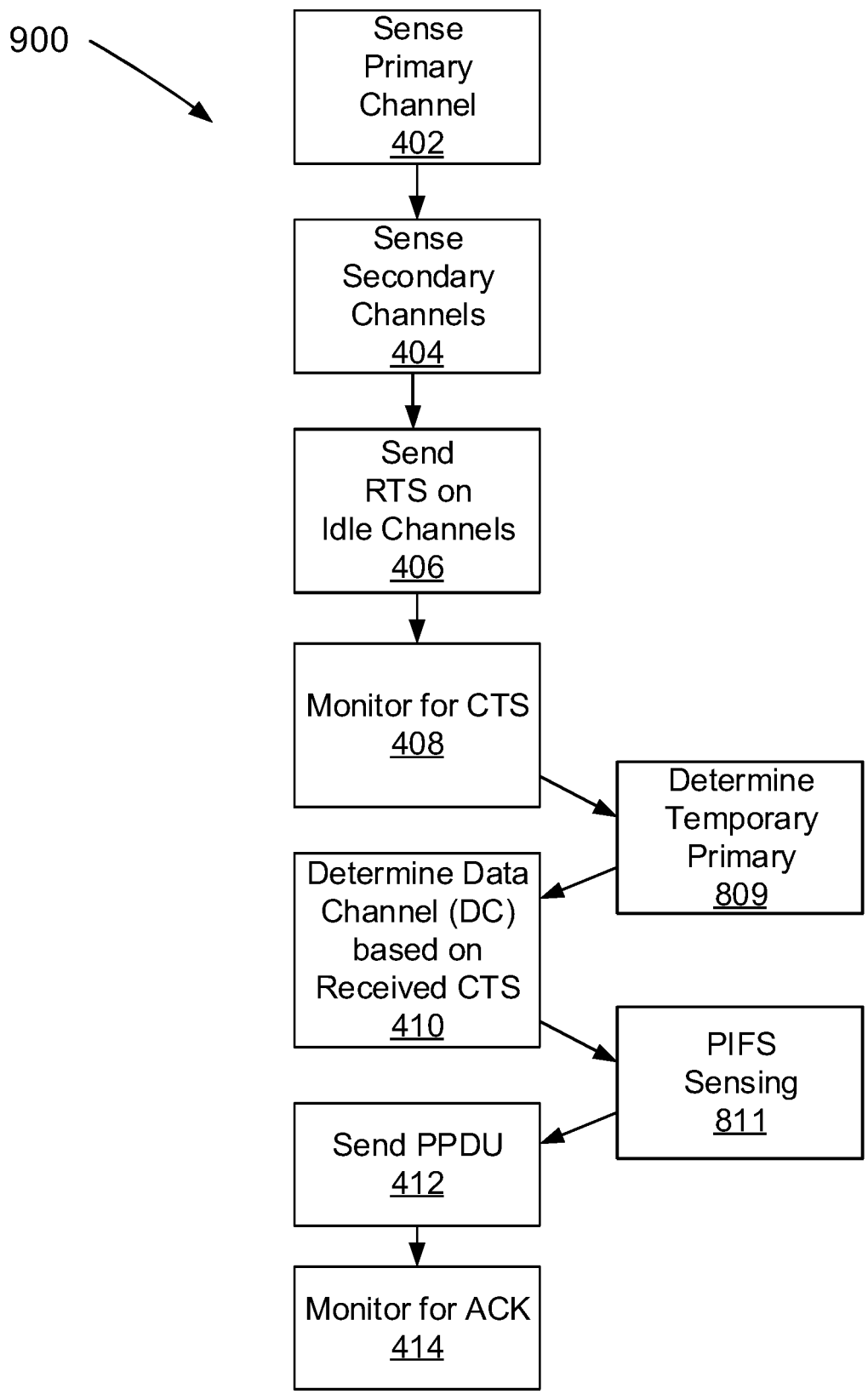
FIG. 9 is a flow chart of a data transmission method that corresponds to the signalling diagram of FIG. 8.

In the embodiment of FIG. 8, actions 402 (sense primary channel) and 404 (sense secondary channel) of data transmission method 900 are performed in the same way as described above in respect of data transmission methods 400 and 700, except that in action 404 the sensing of the secondary channels S(1) to S(N−1) during the PIFS duration is performed concurrently with the end of the BO sensing duration of the primary channel P.

Unlike the above examples, in the illustrated example of FIG. 8, primary channel P is sensed to be idle by the transmit device 302, as well as secondary channels S(1) to S(3).

Accordingly, in action 406 of data transmission method 900, the transmit device 302 sends duplicate RTS frames on the primary channel P and the secondary channels that have also been sensed as idle (e.g., secondary channels S(1) to S(3) in the illustrated example of FIG. 8).

The receive device 304 will respond with a CTS frame in each of the idle channels (from the perspective of the receive device 304) that it successfully receives an RTS frame on. In the illustrated example, receive device 304 successfully receives RTS frames on secondary channels S(2) and S(3), but does not successfully receive the RTS frames on primary channel P or secondary channel S(1). Receive device 304 has been preconfigured with the identity of primary channel P, and accordingly is aware that it has only successfully received RTS frames on secondary channels S(2) and S(3). In example embodiments, receive device 304 will select one of the available secondary channels as a temporary primary channel and indicate that selection through indicator bits in the CTS frames it sends on the available secondary channels. By way of example, in the scenario of FIG. 8, the receive device selects secondary channel S(2) as the temporary primary channel, and accordingly the CTS frame sent on secondary channel S(2) has bit B7 of the service subfield of the PHY header set to "1". The CTS frames sent on secondary channel S(3) has bit B7 of the service subfield of the PHY header set to "0".

As indicated at action 408, transmit device 302 monitors for CTS frames on the channels that used to send RTS frames. As indicated in action 909, transmit device 302 determines the temporary primary channel selection made by the receive device based 304 based on the temporary primary channel selection bits in the respective CTS frames that are received. In the illustrated scenario, transmit device 302 will note that secondary channel S(2) is the selected temporary primary channel.

Data channel selection action 410 of transmission method 900 can be performed in the same manner as in transmission method 700 described above. However, in the example of FIG. 8, rather than performing an additional backoff BO countdown action 611 in respect of the selected temporary primary channel (e.g., secondary channel S(2) in the illustrated example of FIG. 6), in transmission method 900 the transmit device 302 instead performs a PIFS sensing operation (action 811) during which the transmit device 302 senses the temporary primary channel and all of the other secondary channels that make up the data channel DC to confirm that all of the composite channels (e.g., secondary channels S(2) and S(3) in the illustrated example) remain idle for a PIFS duration. If the secondary channels that make up the data channel DC all remain idle for the PIFS duration, then the transmit station 302 will proceed with sending the PPDU using the selected data channel DC, as per action 412. In some examples, if any of the subject channels are sensed busy during PIFS duration of Action 811, the current transmission attempt is suspended and method 900 is started over.

As indicated at action 414, after transmit device 302 sends the PPDU, it monitors for acknowledgment from the receive device 304. In some examples (for example, when both the transmit device 302 and receive device 304 know which secondary channel is the temporary primary channel such as when the receive device 304 has indicated confirmation or selection of the temporary primary channel in a CTS frame), then the receive device 304 may send an ACK frame on only the temporary primary channel and the transmit device 302 will only expect an ACK frame on the temporary primary channel. In other examples, a duplicate ACK frame is sent by the receive device 304 on all the channels C (e.g., the temporary primary channel and any other secondary channels) used for the data transmission channel DC, and transmit device 302 will expect ACK frames on all such channels.

In the above described examples, in some example the PPDU may be a very-high-throughput (VHT) PPDU, a high efficiency (HE) PPDU, or an extremely-high-throughput (EFT) PPDU as defined in the IEEE 802.11 family of standards. The RTS, CTS and ACK frames may be non-HT frames.

Figure 10:
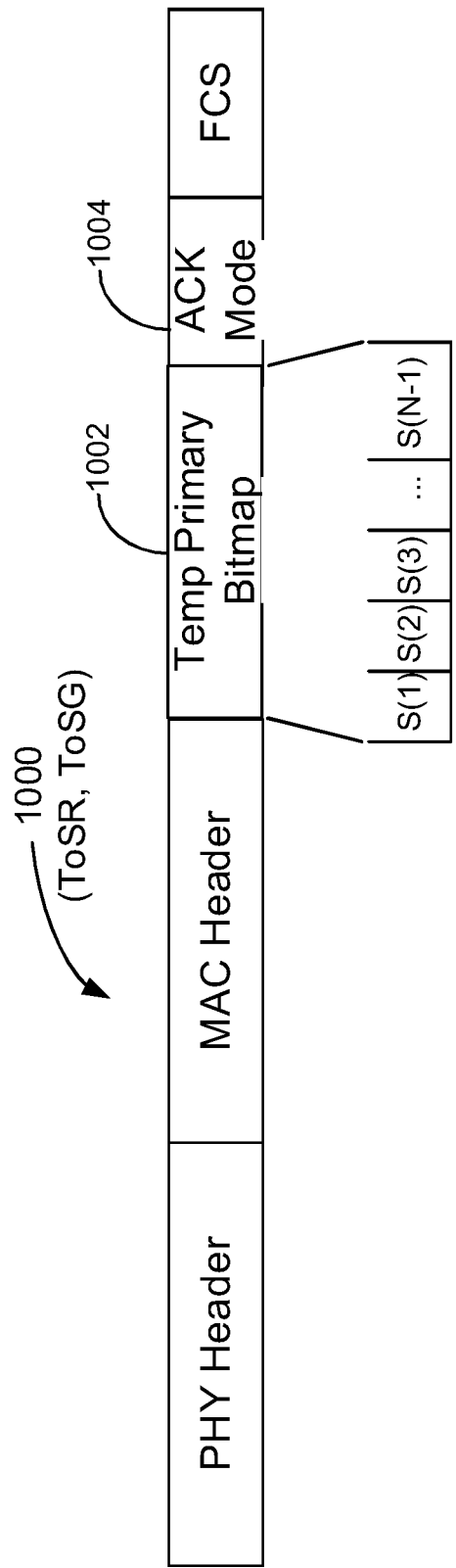
FIG. 10 shows a frame format according to example embodiments.

In alternative embodiments, alternative request and response frame formats may be used to replace RTS and CTS frames, respectively. By way of example, FIG. 10 illustrates and example of a frame format 1000 that can be used for a Transmit on Secondary Request (ToSR) frame and a Transmit of Secondary Granted (ToSG) frame. The frame format 100 can include PHY Header, MAC Header and FCS fields that conform to IEEE 802.11 standard format. A type field can be included in the MAC header to indicate frame type (e.g., ToSR frame or ToSG frame). In the illustrated embodiment, frame format 100 also includes a Temporary Primary Bitmap field 1002 and an ACK mode field. The Temporary Primary Bitmap field 1002 may for example include a set of bit locations that map to respective secondary channels S(1) to S(N−1), with a first value (e.g., "1") in a bit location indicating that the respective secondary channel is to be used as a temporary primary channel and a second value (e.g., "0") indicating that the respective secondary channel is not a temporary primary channel. For example [0, 1, 0, . . . , 0] in Temporary Primary Bitmap Field 1002 indicates that secondary channel S(2) is designated as a temporary primary channel. The ACK Mode field 1004 may be used to indicate a type of acknowledgement signalling that is to be used by the receive device 304. For example, ACK Mode field 1004 may consist of a single bit. A first value (e.g., "0") in the ACK Mode field 1004 can indicate an acknowledgment mode in which a ACK frame is sent only on the temporary primary channel, and a second value (e.g., "1") in the ACK Mode field 1004 can indicate an acknowledgment mode in which a duplicate ACK frame is sent on each of the channels C that combine to form the data channel DC. In some example embodiments, ACK Mode field 1004 may be omitted from frame format 1000.

Figure 11:
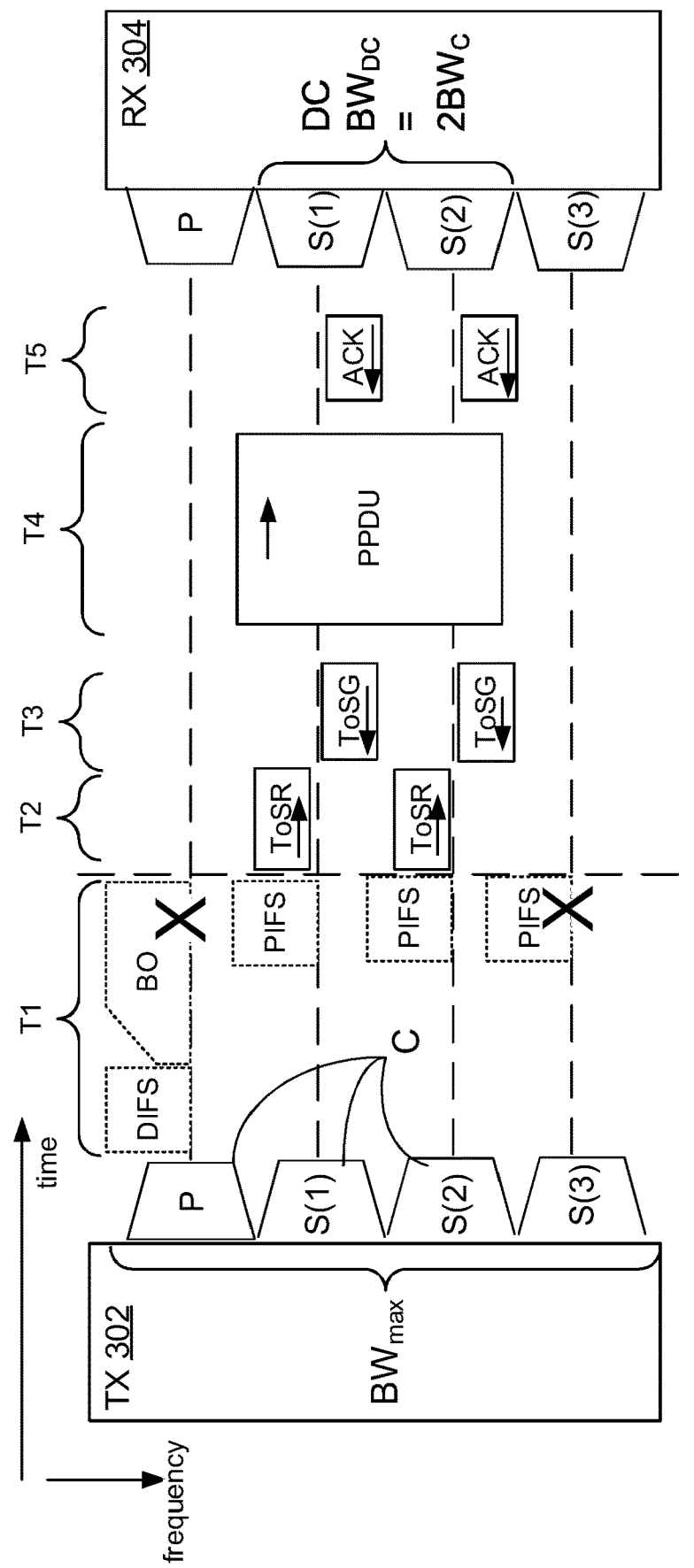
FIG. 11 shows a signalling diagram illustrating a further example of non-primary channel data transmissions between a transmit device and a receive device according to an example the present disclosure.

FIG. 11 illustrates a further example embodiment in which non-primary cannels can be used for a data transmission even when a designated primary channel is not available. In a non-limiting illustrative example, the maximum communication channel bandwidth $BW_{max}$ is 80 MHz, each of the primary channel P and S(1) to S(N−1) secondary channels has a bandwidth $BW_c$ of 20 MHz and N=4, and supported data channel DC bandwidths $BW_{DC}$ include 20, 40, or 80 MHz.

At time period T1, transmit device 302 performs primary channel backoff and secondary channel sensing in the same manner as described above in respect of actions 402 and 404 in any of the previously described examples. In the example of FIG. 11, designated primary channel P is determined based on channel sensing to be busy, as well as secondary channel S(3). At time period T2, transmit device 302 identifies idle secondary channels to send Transmit on Secondary Request ToSR frames to. In some examples, transmit device 302 limits the sending of ToSR fames to idle secondary channels that could be part of a group of channels that could provide a valid multi-channel PPDU format. For example, in the case where supported data channel DC bandwidths $BW_{DC}$ include 20, 40, or 80 MHz, the absence of primary channel leaves only the 40 MHz option open for a valid multi-channel (e.g., wideband) PPDU format. A continuous 40 MHz data channel can be provided by the combination of secondary channels S(1) and S(2). (Note that if secondary channel S(3) was idle, a then the combination of secondary channels S(2) and s(3) could also support a valid multi-channel PPDU format).

In some examples, the transmit device TX 302 may select a candidate secondary channel to use as a temporary primary channel in same manner as described above in respect of Action 605 of data transmission method 700. The candidate secondary channel can be identified in a Transmit on Secondary Request frame ToSR by setting the appropriate bit in the Temporary Primary Bitmap field 1002 of ToSR frame. For example, in FIG. 11, transmit device TX 302 selects secondary channel S(1) to use as a temporary primary channel, and thus sets the first bit in the Temporary Primary Bitmap field 1002 of ToSR frame to 1 and all other bits to 0.

In some examples, transmit device TX 302 will also set the ACK mode indication bit in the ACK Mode field 1004 of ToSR frame. In the illustrated embodiment, the ACK mode indication bit is set to indicate a duplicate ACK frame mode.

During time period T2, duplicate copies of the ToSR frame are sent by transmit device 302 to all of the idle secondary channels that can support a valid multi-channel PPDU format (e.g., secondary channels S(1) and S(2) in the illustrated example).

The receive device 304 will respond with a Transmit on Secondary Granted ToSG frame during time period T3 in each of the channels that it successfully received an ToSR frame over. In the illustrated example, receive device 304 successfully receives ToSR frames on secondary channels S(1) and S(2), and accordingly will respond with ToSG frames on secondary channels S(1) and S(2).

The ToSG frames sent on secondary channels S(1) and S(2) can be duplicate fames. The content of the duplicate ToSG frames can be set by the receive device 304 as follows. Based on the temporary primary bitmap field 1001 included in the received ToSR frames, receive device 304 can determine the secondary channel that has been proposed as the temporary primary channel (e.g., secondary channel S(1) in the illustrated example). Receive device 304 can either confirm the proposed temporary primary channel or respond with a different temporary primary channel indication by setting the appropriate bit in the temporary primary bitmap field 1002 of the ToSG frame. Similarly, receive device 304 can either confirm the ACK mode indicated in the ACK mode field 1004 of the ToSR frame by setting the bit in the ACK Mode field of ToSG frame 1004. In the illustrated example, receive device 304 confirms the selection of secondary channel S(1) as the temporary primary channel and confirms the ACK mode selected by the transmit device 304 and sets the appropriate bits in the ToSG frame that is duplicated and sent to the transmit device 304 on secondary channels S(1) and S(2).

In some examples, temporary primary channel selection and/or an ACK mode selection may not be performed by the transmit device 302 prior to sending of the ToSR frames, in which case the receive device 304 may make the temporary primary channel selection and/or an ACK mode selection without input from the transmit device 302.

Transmit device 302 monitors the channels that it sent the ToSR frames on for responding ToSG frames. Based on the received ToSG frames transmit device 302 selects the combination of channels C to use as a data channel DC, and confirms which secondary channel is to be used as the temporary primary channel and what ACK mode is to be used. At time period T4, the transmit device sends the PPDU using the selected data channel DC.

In the illustrated example, the selected ACK mode specified the use of duplicate ACK frames, and accordingly when the receive device 304 successfully receives the PPDU frame it will send out a duplicate ACK frame on each of the constituent channels of the data channel DC at time period T5. The transmit device 302 monitors for ACK frames on each of the constituent channels of the data channel DC (e.g., secondary channels S(1) and S(2) in the illustrated example).

Figure 12:
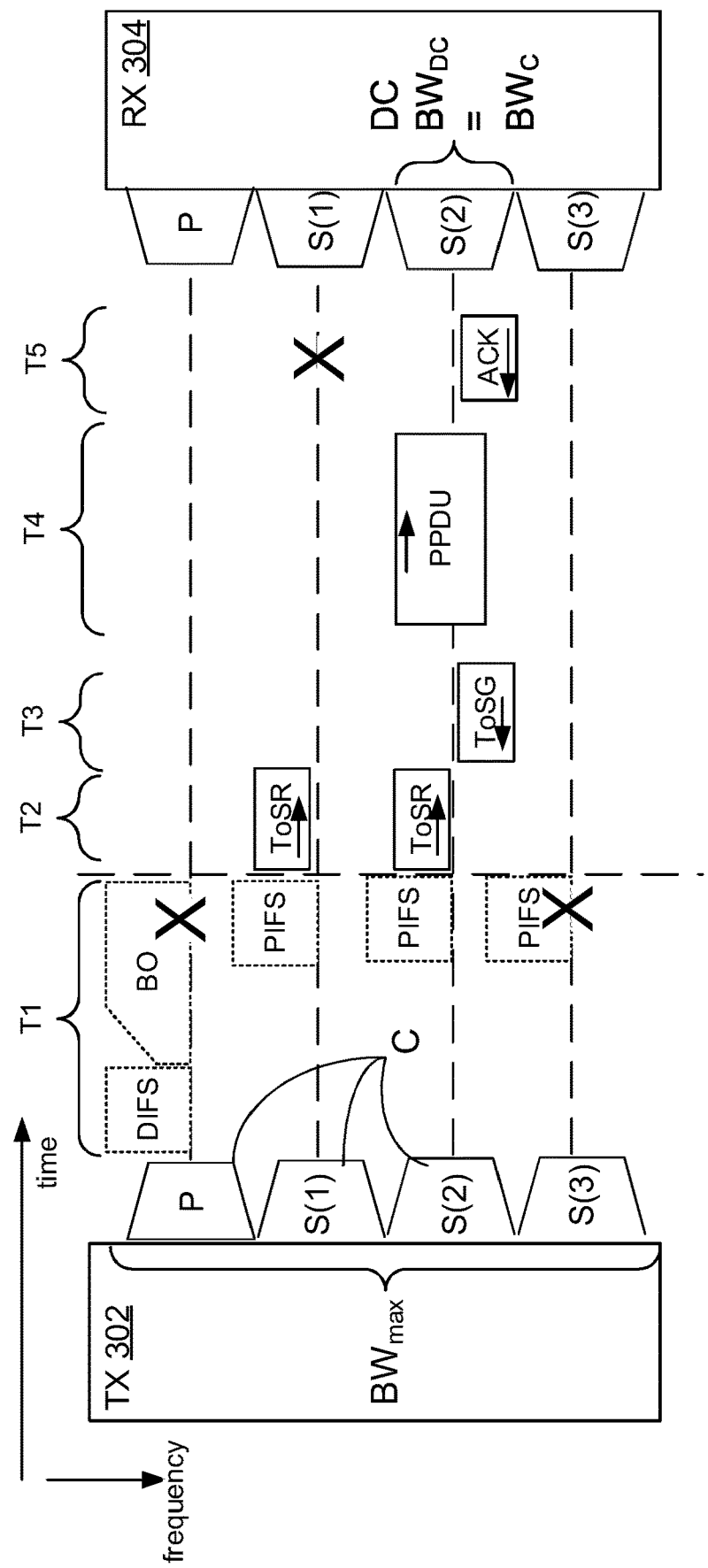
FIG. 12 shows a signalling diagram illustrating a further example of non-primary channel data transmissions between a transmit device and a receive device according to an example the present disclosure.

In some applications the example of FIG. 12 may be modified to include an action such as backoff action 611 or PIFS sensing action 811 between time periods T3 and T4. For example, a backoff BO duration can be added between time periods T3 and T4 during which the transmit device 302 senses the temporary primary channel (e.g., secondary channel S(1)) for interference to ensure the data transmission can proceed.

FIG. 12 illustrates a further example embodiment in which non-primary cannels can be used for a data transmission even when a designated primary channel is not available. The example of FIG. 12 is similar to that of FIG. 11 with the exception of the differences described below. In particular, in the example of FIG. 12, the ToSR frame sent by transmit device 302 in time period T2 using secondary channel S(1) is not successfully received by receive device 304. Accordingly, receive device 304 responds with a ToSG frame only on secondary channel S(2). The ToSG frame indicates that secondary channel S(2) is to be used as the temporary primary channel, and that the ACK mode will comprise a non-duplicate ACK frame on only the temporary primary channel.

Transmit device 302 receives a ToSG frame only on secondary channel S(2) and thus selects secondary channel S(2) as the data channel DC. At time period T4, the transmit device sends the PPDU using the selected data channel DC. Receive device 304 sends out a non-duplicate ACK frame on the single secondary channel S(2) of the data channel DC at time period T5. The transmit device 302 monitors for the ACK frames on secondary channel S(2).

Figure 13:
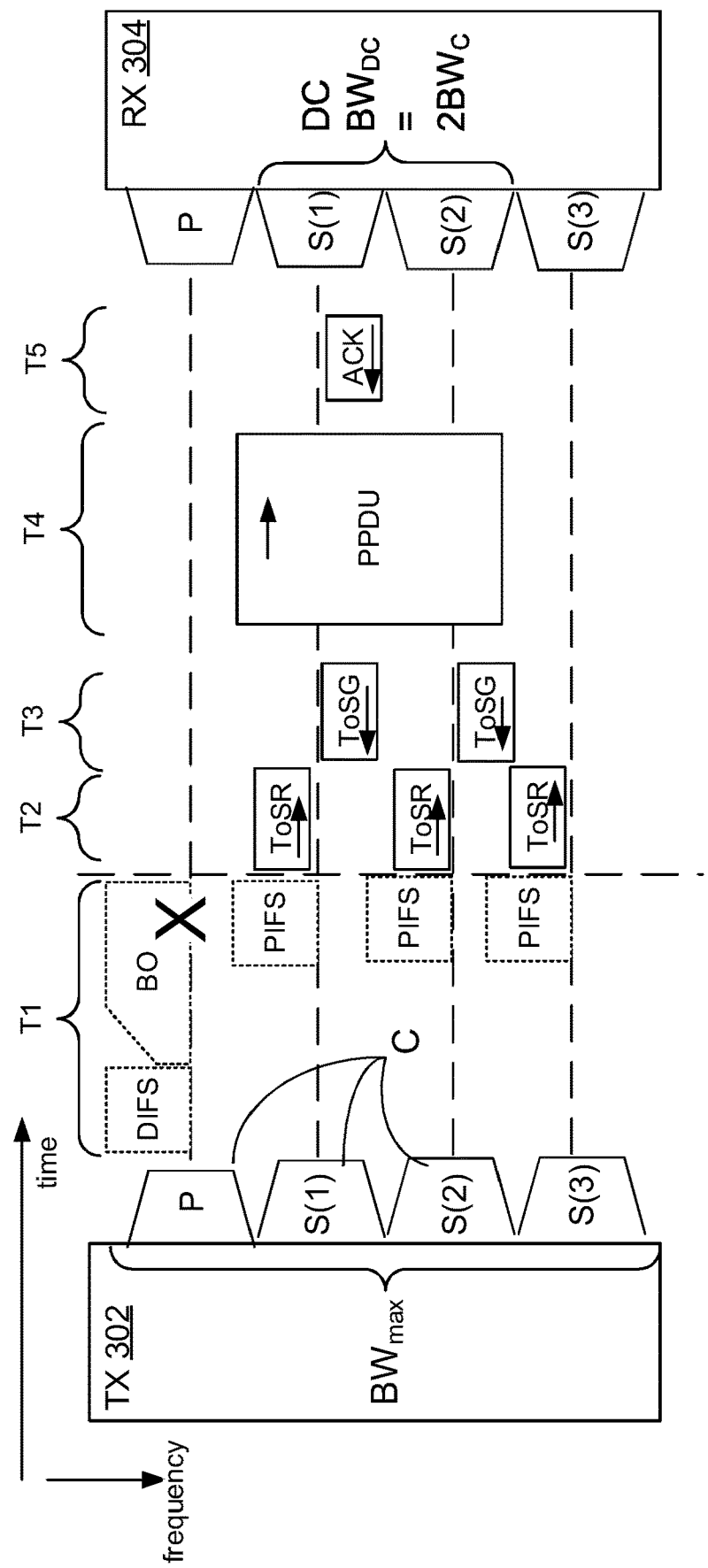
FIG. 13 shows a signalling diagram illustrating a further example of non-primary channel data transmissions between a transmit device and a receive device according to an example the present disclosure.

FIG. 13 illustrates a further example embodiment in which non-primary cannels can be used for a data transmission even when a designated primary channel is not available. The example of FIG. 13 is similar to that of FIG. 11 with the exception of the differences described below. In particular, in the example of FIG. 13, the transmit device 302 determines that secondary channels S(1), S(2) and S(3) are all available, and accordingly sends a ToSR frame out on all three of the secondary channels S(1), S(2) and S(3) in time period T2. Furthermore, receive device 304 successfully receives the ToSR frames on all three of the secondary channels S(1), S(2) and S(3).

In example embodiments, receive device 304 is configured to only respond with ToSG frames on a set of secondary channels that can support a valid PPDU format. In the illustrated example, valid PPDU formats include 20, 40 or 80 MHz bandwidths. Accordingly, a combination of three secondary channels that provides 60 MHz bandwidth is not a viable option. The largest bandwidth valid data channel DC that is available is 40 MHz and receive device 304 can select either the combination of adjacent secondary channels S(1) and S(2) or adjacent secondary channels S(2) and S(3) to from such a channel. The selection may be made according to predetermined criteria (for example the channels that are closest in frequency to the designated primary channel P). In the illustrated example, receive device 304 selects the combination of adjacent secondary channels S(1) and S(2). In the illustrated example, the receive device 304 generates a ToSG frame for sending on each of secondary channels S(1) and S(2), and the ToSG frame indicates secondary channel S(1) as temporary primary channel and the ACK mode as non-duplicate ACK mode. Receive device 304 sends a copy of the ToSG frame on each of secondary channels S(1) and S(2), and sends nothing on secondary channel S(3).

After receiving ToSG frames on each of secondary channels S(1) and S(2), the transmit device 302 sends the PPDU, using the combination of secondary channels S(1) and S(2) as data channel DC. The ToSG frames also inform the transmit device 302 that the ACK mode is non-duplicate ACK mode and that the temporary primary channel is secondary channel S(1). Accordingly, after sending PPDU, transmit device 302 monitors only secondary channel S(1) for an ACK frame.

After successfully receiving the PPDU, the receive device 304 sends a single non-HT ACK frame on only the temporary primary channel (secondary channel S(1)). It will be noted that the non-duplicate ACK mode can eliminate ACK signalling on secondary channels that are not the temporary primary channel. This can free up time frequency resources and also reduce signal processing and power consumption at the receive device 304, which may be a power limited edge device in some examples.

The present disclosure provides certain example algorithms and calculations for implementing examples of the disclosed methods and systems. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

Through the descriptions of the preceding embodiments, example embodiments may be implemented by using hardware only, or by using software and a necessary universal hardware platform, or by a combination of hardware and software. Based on such understandings, the technical solution of the present disclosure may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure.

The invention claimed is:

1. A method for transmitting data by a transmit device in a wireless communication channel bandwidth of a wireless network, the wireless communication channel bandwidth including a set of adjacent frequency channels of uniform bandwidth that comprise a primary channel for the transmit device and a plurality of secondary channels, the method comprising:

sending, by the transmit device, when the primary channel is sensed by the transmit device to be busy, a transmit-on-secondary-request (ToSR) request frame for a receive device on one or more of the secondary channels that are sensed by the transmit device to be idle;

monitoring, by the transmit device, for a transmit-on-secondary-granted (ToSG) response frame on each of the one or more of the secondary channels;

selecting, by the transmit device, a contiguous set of the secondary channels on which the transmit device received a response frame from the receive device, to use for a data channel;

selecting, by the transmit device, one of the secondary channels in the data channel as a temporary primary channel;

determining, by the transmit device, to apply either a first acknowledgement mode or a second acknowledgement mode;

sending, by the transmit device, a data transmission for the receive device using the data channel; and in response to sending the data transmission, monitoring, by the transmit device, for at least one acknowledgement frame, wherein in the first acknowledgement mode the transmit device will monitor for a duplicate acknowledgment frame on all of the secondary channels included in the data channel, and in the second acknowledgement mode the transmit device will monitor for an acknowledgment frame only on a secondary channel that is known by the transmit device as the temporary primary channel;

wherein the ToSR and ToSG each comprise a Physical (PHY) Header and a Medium Access Control (MAC) Header, a temporary primary bitmap field including respective bit locations mapping to respective secondary channels for indicating one of the secondary channels as the temporary primary channel, and an acknowledgement mode field for selectively indicating the first acknowledgement mode or the second acknowledgement mode.

2. The method of claim 1 wherein each of the primary channel and the secondary channels has a bandwidth of 20 MHz, and the request frame and the response frame each have respective frame formats configured for a 20 MHz channel.

3. The method of claim 1, comprising, prior to sending the data transmission, sensing the secondary channels included in the data channel to confirm that the data channel is idle.

4. An access point station (AP) for transmitting data for a station (STA) in a communication channel bandwidth of wireless local area network (WLAN), the wireless communication channel bandwidth including a set of adjacent frequency channels of uniform bandwidth that comprise a primary channel assigned to the AP and a plurality of secondary channels, the AP comprising:

a processing unit;

a transmitter and receiver coupled to the processing unit for sending and receiving signals in the WLAN; and a non-transient storage storing executable instructions that, when executed by the processing unit, cause the AP to:

send, when the primary channel is sensed by the AP to be busy, a transmit-on-secondary-request (ToSR) request frame for a STA on one or more of the secondary channels that are sensed by the AP to be idle;

monitor for a transmit-on-secondary-granted (ToSG) response frame on each of the one or more of the secondary channels;

select a contiguous set of the secondary channels on which the AP received a response frame from the STA, to use for a data channel;

select one of the secondary channels in the data channel as a temporary primary channel;

apply either a first acknowledgement mode or a second acknowledgement mode;

send a data transmission for the STA using the data channel; and in response to sending the data transmission, monitor for at least one acknowledgement frame, wherein in the first acknowledgement mode the AP will monitor for a duplicate acknowledgment frame on all of the secondary channels included in the data channel, and in the second acknowledgement mode the AP will monitor for an acknowledgment frame only on a secondary channel that is known by the AP as the temporary primary channel;

wherein the ToSR and ToSG each comprise a Physical (PHY) Header and a Medium Access Control (MAC) Header, a temporary primary bitmap field including respective bit locations mapping to respective secondary channels for indicating one of the secondary channels as the temporary primary channel, and an acknowledgement mode field for selectively indicating the first acknowledgement mode or the second acknowledgement mode.

5. The AP of claim 4 wherein each of the primary channel and the secondary channels has a bandwidth of 20 MHz, and the request frame and the response frame each have respective frame formats configured for a 20 MHz channel.

6. The AP of claim 4, wherein the executable instructions, when executed by the processing unit, cause the AP to: prior to sending the data transmission, sense the secondary channels included in the data channel to confirm that the data channel is idle.

7. A non-transient computer readable medium storing computer implementable instructions for configuring a transmit device for transmitting data for a receive device in a communication channel bandwidth of wireless network, the wireless communication channel bandwidth including a set of adjacent frequency channels of uniform bandwidth that comprise a primary channel assigned to the transmit device and a plurality of secondary channels, the instructions including instructions for:

sending, by the transmit device, when the primary channel is sensed by the transmit device to be busy, a transmit-on-secondary-request (ToSR) request frame for a receive device on one or more of the secondary channels that are sensed by the transmit device to be idle;

monitoring, by the transmit device, for a transmit-on-secondary granted (ToSG) response frame on each of the one or more of the secondary channels;

selecting, by the transmit device, a contiguous set of the secondary channels on which the transmit device received a response frame from the receive device, to use for a data channel;

selecting, by the transmit device, one of the secondary channels in the data channel as a temporary primary channel;

determining, by the transmit device, to apply either a first acknowledgement mode or a second acknowledgement mode;

sending, by the transmit device, a data transmission for the receive device using the data channel; and in response to sending the data transmission, monitoring, by the transmit device, for at least one acknowledgement frame, wherein in the first acknowledgement mode the transmit device will monitor for a duplicate acknowledgment frame on all of the secondary channels included in the data channel, and in the second acknowledgement mode the transmit device will monitor for an acknowledgment frame only on a secondary channel that is known by the transmit device as the temporary primary channel;

wherein the ToSR and ToSG each comprise a Physical (PHY) Header and a Medium Access Control (MAC) Header, a temporary primary bitmap field including respective bit locations mapping to respective secondary channels for indicating one of the secondary channels as the temporary primary channel, and an acknowledgement mode field for selectively indicating the first acknowledgement mode or the second acknowledgement mode.

8. A method for receiving data sent by a transmit device in a wireless communication channel bandwidth of a wireless network, the wireless communication channel bandwidth including a set of adjacent frequency channels of uniform bandwidth that comprise a primary channel for the transmit device and a plurality of secondary channels, the method comprising:

receiving, at a receive device, a transmit-on-secondary-request (ToSR) request frame on one or more of the secondary channels;

sending, by the receive device, a transmit-on-secondary-granted (ToSG) response frame on at least some of the one or more of the secondary channels;

determining, by the receive device, based on information included in one or more ToSR request frames, to apply either a first acknowledgement mode or a second acknowledgement mode;

receiving, by the receive device, a data transmission through a data channel that includes a contiguous set of the secondary channels on which the receive device sent the response frames, the data channel excluding the primary channel and including a temporary primary channel; and in response to receiving the data transmission, sending, by the receive device, at least one acknowledgement frame, wherein in the first acknowledgement mode the receive device will send duplicate acknowledgment frames on all of the secondary channels included in the data channel, and in the second acknowledgement mode the receive device will send an acknowledgment frame only on a secondary channel;

wherein the ToSR and ToSG each comprise a Physical (PHY) Header and a Medium Access Control (MAC) Header, a temporary primary bitmap field including respective bit locations mapping to respective secondary channels for indicating one of the secondary channels as the temporary primary channel, and an acknowledgement mode field for selectively indicating the first acknowledgement mode or the second acknowledgement mode.

\* \* \* \* \*